United States Patent
Bensberg et al.

(10) Patent No.: US 10,534,797 B2
(45) Date of Patent: Jan. 14, 2020

(54) SYNCHRONIZED UPDATES ACROSS MULTIPLE DATABASE PARTITIONS

(71) Applicant: SAP SE, Walldorf (DE)

(72) Inventors: Christian Bensberg, Heidelberg (DE); Martin Heidel, Walldorf (DE); Lars Fricke, Karlsruhe (DE); Holger Bischoff, Walldorf (DE); Joern Schmidt, Walldorf (DE); Edward-Robert Tyercha, Heidelberg (DE)

(73) Assignee: SAP SE, Walldorf (DE)

( * ) Notice: Subject to any disclaimer, the term of this patent is extended or adjusted under 35 U.S.C. 154(b) by 318 days.

(21) Appl. No.: 15/365,693

(22) Filed: Nov. 30, 2016

(65) Prior Publication Data

US 2018/0150544 A1    May 31, 2018

(51) Int. Cl.
*G06F 16/27*    (2019.01)
*G06F 16/23*    (2019.01)

(52) U.S. Cl.
CPC ........ *G06F 16/278* (2019.01); *G06F 16/2379* (2019.01)

(58) Field of Classification Search
CPC . G06F 17/278; G06F 17/2379; G06F 17/2365
See application file for complete search history.

(56) References Cited

U.S. PATENT DOCUMENTS

| | | | |
|---|---|---|---|
| 5,960,194 A * | 9/1999 | Choy | G06F 9/355 |
| 2005/0050083 A1* | 3/2005 | Jin | G06F 17/30377 |
| 2005/0091180 A1* | 4/2005 | Peleg | G06F 17/30383 |
| 2008/0201290 A1* | 8/2008 | Ponmudi | G06F 16/217 |
| 2010/0125557 A1* | 5/2010 | Wang | G06F 17/30206 707/690 |
| 2011/0153574 A1* | 6/2011 | Solimano | G06F 17/30371 707/687 |
| 2011/0167038 A1* | 7/2011 | Wang | G06F 16/27 707/627 |

* cited by examiner

*Primary Examiner* — Loc Tran
(74) *Attorney, Agent, or Firm* — Mintz Levin Cohn Ferris Glovsky and Popeo, P.C.

(57) ABSTRACT

A first store and a second store can be configured to store a first partition of a table of a database and a second partition of the table of the database, respectively. A database management system can be configured to at least update at least a first portion of the first partition where the update includes an update to a first primary key column in the first partition and verify that the first primary key column is unique across the first partition and the second partition. A first row having a first primary key value of the first primary key column from the first partition can be deleted, when the first primary key value in the first partition conflicts with a second primary key value of a second primary key column in the second partition.

24 Claims, 9 Drawing Sheets

SYNCHRONIZED UPDATES ACROSS MULTIPLE DATABASE PARTITIONS

TECHNICAL FIELD

The subject matter described herein relates to database management systems and, in particular, relates to updating items across multiple partitions of a database table in a database management system.

BACKGROUND

The demand for ad-hoc and real-time data analyses by many users simultaneously is increasing in the same way that the data quantities to be processed are increasing. To keep pace with the competition in the current economic climate, it is crucial to have the latest information about processes within an organization (e.g. a company) and/or in the market to be able to make the right decisions promptly.

Data in a database needs to be constantly updated to ensure that the latest information is available to users of the database. Updating data items in a multiple-partition database can result in conflicts between the partitions of the multi-partition database.

SUMMARY

In one aspect, a method is described for managing partitions of a table stored in different stores. A first store can be configured to at least store a first partition of a table of a database. A second store can be configured to at least store a second partition of the table of the database. A database management system configured to at least perform one or more operations to maintain the uniqueness of tuples within the partitions stored on different stores.

At least a first portion of a first partition of a table of a database in a first store can be updated. The updating of the at least the first portion of the first partition can include an update to a first primary key column in the first partition. It can be verified that the first primary key column is unique across the first partition and the second partition of the table of the database in the second store. A first row having a first primary key value of the first primary key column from the first partition can be deleted when the first primary key value in the first partition conflicts with a second primary key value of a second primary key column in the second partition.

In some variations, one or more of the following features can be optionally performed. At least a second portion of the second partition can be updated. The updating of the at least the second portion of the second partition can include an update to a second primary key value of the second primary key column in the second partition. It can be verified that the second primary key value is unique across the first partition and the second partition.

A second row having the second primary key value can be deleted from the second partition when the second primary key value conflicts with a first primary key value in the first partition. It can be verified that the first primary key value is unique across the first partition and the second partition subsequent to the update of the first partition. It can be verified that the second primary key value is unique across the first partition and the second partition subsequent to the update of the second partition.

It some variations, it can be verified that the first primary key value is unique across the first partition and the second partition using a control flow between the first partition and the second partition. The control flow can be separate from a data flow between the first partition and the second partition. At least the first portion of the first partition can be updated by adding an additional row having a new primary key value to the first partition.

At least the first portion of the first partition can be modified by modifying an existing primary key value in the first partition. The existing primary key column in the first partition can be modified by numerically shifting a value of the primary key values of the existing primary key column.

In some variations, updating of the at least the first portion of the first partition can be facilitated by a data object that includes an indication of the updated primary key values in the first partition. A data object that includes an indication of the first row to delete from the first partition can be deleted to facilitate deletion of rows from partitions that have conflicting primary key values.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

A database can include one or more database tables having multiple partitions. A database can refer to an organized collection of data. The collection of data can include a collection of schemas, tables, queries, reports, views, and other objects. The collection of data can be organized in a way that supports processes requiring information contained in the database. A table can refer to a collection of related data held in a structured format within a database. A table can comprise columns, and rows. Each column can contain data having the same type. A row, often referred to as a record or tuple, can represent a single structured data item within a table. Each row in a table can have a unique primary key value. The primary key value associated with each row can be used to identify that single structured data item within the table. For example, primary key value number 1 of table number 1 should always refer to the same single set of structured data, record or tuple. The primary key value associated with each row of a table should be unique across all partitions of the table.

A partition of a table is a division of a table into two or more parts. When partitions are updated the primary key values may be modified or new ones added which, in some circumstances, can lead to duplicate primary key values appearing in different partitions. Duplicate primary key values will lead to errors arising in a database management system where more than one data record can be called when referenced by a single primary key value.

The presently described subject matter provides a solution to avoid partitions having conflicting primary key values. The presently described subject matter generates an execution plan for updating the multiple partitions of a database table. The execution plan can include synchronization points that determine whether there is a conflicting primary key value, thereby ensuring that all primary key values in a database table are unique across all partitions. When a conflicting primary key value is detected, the presently described subject matter can be configured to delete and/or roll-back the rows of the partition that are in conflict. The presently described subject matter separates control flows and data flows. By separating control flows and data flows, transfer of data between nodes can be reduced.

A table can be split into multiple partitions in a variety of ways. A partition can include a range of rows of a table. A table can consist of fields, columns, and rows. In some variations, the cells of the table may include database commands linking to data that is held externally to the database. One table partitioning technique includes range partitioning. In a range-partition of a table the partition can include data from the table filtered by a range of values for a particular column. For example, a first partition can include all rows of a table where the column "zipcode" has a value between 7000 and 7999 and a second partition can include all rows of a table where the column "zipcode" has a value between 8000 and 8999. In some variations, a table can be list-partitioned. A list partition includes a partition that includes data from a table that matches one of a list of values. For example, a list partition can include a partition that contains all records having a "country" value of Denmark, Finland, Iceland, and Norway. Partitioning can be performed using a combination of different partitioning techniques. Other partitioning techniques include "round-robin" partitioning where the a table is divided into n partitions of m rows each, hash partitioning, in which a hash function is applied to an attribute of a record to produce a partition number in which that record will be stored, or the like.

In some variations, different partitions can be stored in different data stores. The different data stores can be at different nodes of a computer network. A node of a computer network can include a connection point for the network. A physical node can be an electronic device that is connected to a network and is capable of creating, receiving and transmitting information over a communication channel with one or more other nodes of the network.

Each of the rows can have a unique primary key value to distinguish the data records, or tuple, in that row. When one partition of the database is updated, row(s) in that partition may be given a new primary key value(s). Other partitions of the database may also be updated and, therefore, row(s) in those other partitions may also be given a new primary key value(s). This can lead to more than one partition of a database having rows that have the same primary key value. This will cause an error in the database management system.

In some variations, a group of rows may be updated during a partition update. The primary key values for those rows may be modified during the update. At a synchronization point during the update procedure, a determination can be made as to whether any of the modified primary key values conflict with primary key values in one or more other partitions of the table. If there is a conflict, then the conflicting rows can be deleted and/or rolled-back to prior, non-conflicting, versions.

A database system can typically include a database management system. A database system, as used herein, can refer to the computing system supporting the database management system, one or more client devices interacting with the database management system, one or more third-party devices, or the like. A database management system can include a computer software application that interacts with a user of a database, other applications, and the database itself to capture and analyze data. A general-purpose database management system can be designed to allow the definition, creation, querying, update, and administration of a database. The database management system can comprise multiple layers or levels. The different layers can be configured to perform different types of operations. For example, the lowest layer, or physical layer, of a database management system can be configured to perform the actual operations requested by the users of the database management system. At the physical layer, a conceptual instruction provided by a user may have been translated into many instructions that are readable by the database.

The database management system can be configured to interact with one or more data stores on one or more nodes. Each data store can be configured to store one or more partitions of a table of a database managed by the database management system.

A middle layer, or logical layer, can be configured to consolidate external concepts and instructions into an intermediate data structure. The intermediate data structure can be capable of being devolved into the physical instructions for implementation at the physical layer. The logical layer can be configured to provide execution pathways of operations to multiple different databases and/or database tables, in response to instructions received from the top layer, or view layer.

The view layer can be configured to implement applications that are provided to users of the database management system. Database operations can be represented as database access. In some variations, individual databases within a database system can be viewed as the same at this layer, despite differences in content and operation of those individual databases.

In some variations, the view layer can be a calculation engine layer. The calculation engine layer can be configured to facilitate the processing of user queries and requests using diverse calculation operations. When processing queries, having the tables loaded into the main memory of the database management system increases the efficiency at which the database management system can execute queries, improving the optimization of the database management system.

Figure 1:
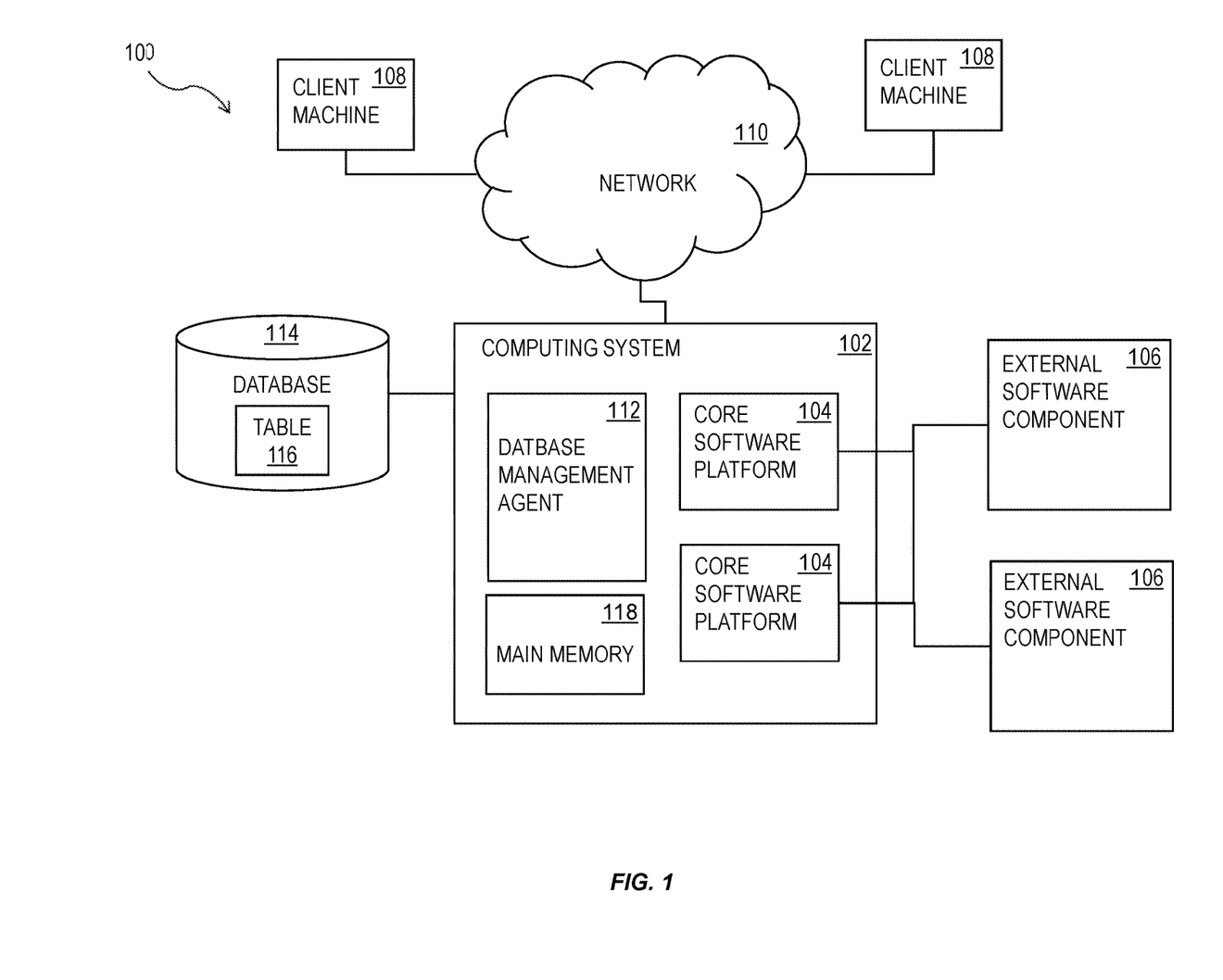
FIG. 1 shows a diagram of a system that can implement one or more features consistent with the present description.

FIG. 1 shows a diagram of a system 100 that can implement one or more features of the presently described subject matter. A computing system 102 can include one or more core software platform modules 104 providing one or more features of a software system or other software that includes database management features. The computing system can also aggregate or otherwise provide a gateway via which users can access functionality provided by one or more external software components 106. One or more client machines 108 can access the computing system, either via a direct connection, a local terminal, or over a network 110 (e.g. a local area network, a wide area network, a wireless network, the Internet, or the like).

A database management agent 112 or other comparable functionality can access a database 114 that includes at least one table 116, which can in turn include at least one column. The database management agent 112 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

The database management agent 112 or other comparable functionality can be configured to load a database table 116, or other comparable data set, into the main memory 118. The database management agent 112 can be configured to load the information from the database 114 to the main memory 118 in response to receipt of a query instantiated by a user or computer system through one or more client machines 108, external software components 106, core software platforms 104, or the like.

Figure 2:
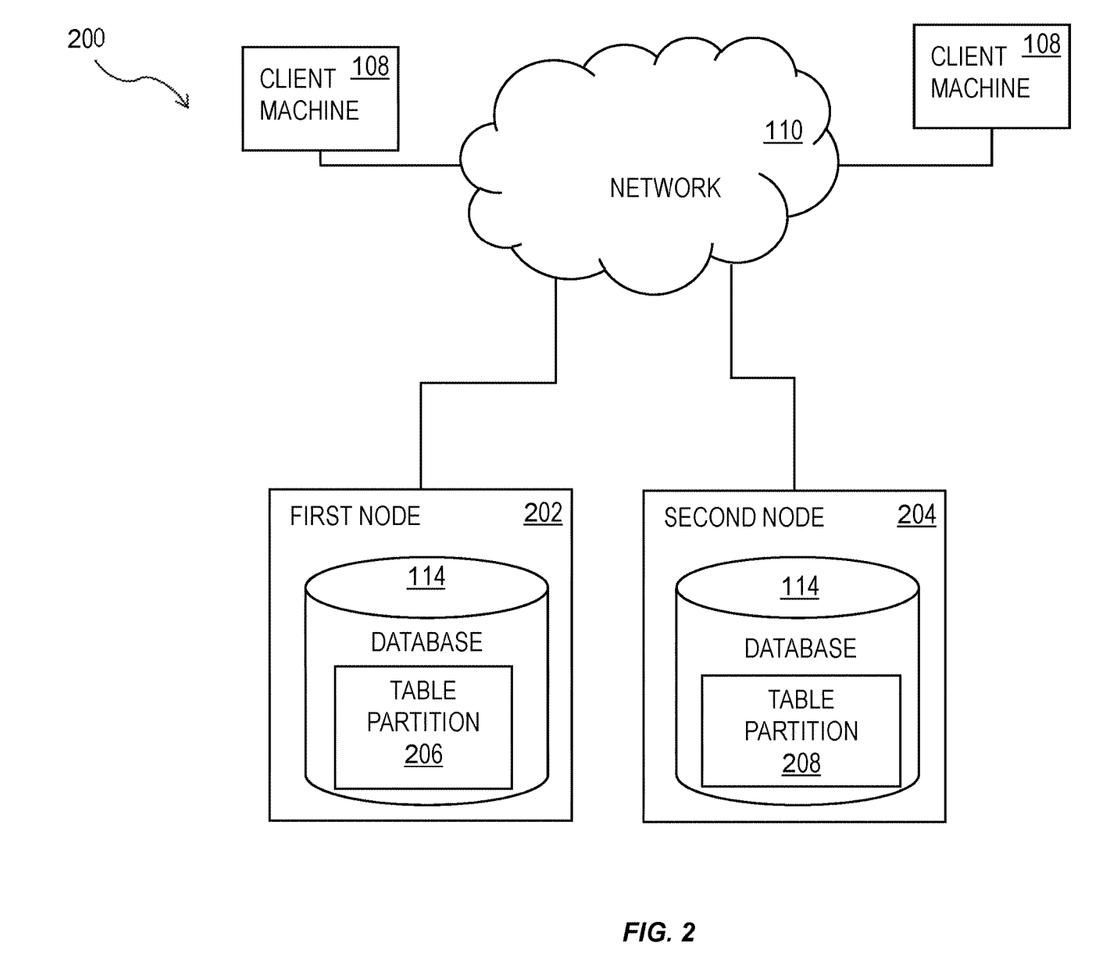
FIG. 2 shows a diagram of a system that can implement one or more features consistent with the present description.

FIG. 2 shows a diagram of a system 200 that can implement one or more features of the presently described subject matter. The system 200 can include a first node 202 and a second node 204. The first node 202 and the second node 204 can include one or more features of the computing system 102 illustrated in FIG. 1. The first node 202 can include a first partition 206 of a table, such as table 114 illustrated in FIG. 1. The second node 204 can include a second partition 208 of a table, such as table 114 illustrated in FIG. 1.

The first node 202 and the second node 204 can be individual computer servers. The first node 202 and the second node 204 can be located in different physical locations. The first node 202 and the second node 204 can be logically separated from each other. A table can be partitioned for a number of reasons. For example, a table can be partitioned to spread the processing and memory requirements for processing and/or managing the table across multiple devices. As another example, the table can be partitioned in a manner that puts records geographically closer to the individuals that use those records, thereby increasing the efficiency at which queries on the data can be received and results sent back to users.

Each row of a table, whether it is partitioned or not, can include a primary key value. The primary key value can be unique to each record in a table. When a query is processed, by a computing system, for example, computing system 102, the query may call a record that has a unique primary key value. That record may be located in a partition, for example, partition 206 on the first node 202. When the record is called, the computing system 102 needs to be able to obtain one and only one record. Otherwise, the computing system 102 would receive multiple records in response to running the query which could cause a conflict to arise during downstream processing of the data.

Each node, such as the first node 202 and the second node 204 can be configured to load their partition, 206 and 208, respectively, of database 114, for example, into main memory located in each node.

The database 114, including the database table 116, can be updated periodically. The table 116 may include rows and columns. The rows may represent data that has a common link whereas the columns are arranged by data-type. In some variations, updating the database table 114 can include amending the values in columns associated with particular rows. In other variations, updating the database table 114 can include adding additional rows to the database table 114. When the database table 114 is partitioned, for example, into a first partition 206 and a second partition 208, situations can arise where the partitions can be separately updated. In some variations, the first partition 206 and the second partition 208 can be stored separately in different data stores on different nodes.

Each record in a database table 114 can include a unique record identifier called a unique primary key value. When the table 114 is partitioned, the primary key values of the rows in each partition are unique across all partitions. For example, the rows in the first partition 206 and the rows in the second partition 208 all have a unique primary key value not repeated in any other partition. When queries are run using diverse data, as described further, below, neither the client machine 108 that requested the query, nor even the core software platforms 104, would see the multiple different partitions. Instead, the client machine 108 and the core software platforms 104, would see and reference a single table, and records within that table.

If the first partition 206 and the second partition 208 each had a row that had a common primary key value, then the data from both rows would be returned when a computing system, such as computing system 102, requested the data associated with that common primary key value. This could cause errors in the results of a query and/or cause execution of a query to be halted entirely.

If the table is partitioned on columns that are also part of the primary key, then it is sufficient to check the uniqueness of the primary key only in the local partition. As an example, consider an ID column as the primary key and that column is also the partitioning column. When value ID=5 is used to partition the table, the partitioning logic can be configured to determine which partition a particular row is to be inserted. Each row having value ID=5 will be partitioned into the same partition. Therefore, when updating rows with value ID=5 it is sufficient to check the uniqueness of the ID column within the single partition into which all rows with value ID=5 were partitioned. However, other partitioning options are available. Other partitioning options can include, for example, 1) partitioning on non-primary key columns, 2) multi-level partitioning with several levels of partitioning with different functions and columns on each level, or the like. Moreover, more than one key may be defined (additional keys can be referred to as secondary keys, indices, or the like), that may be defined on non-partitioning columns. In such cases, uniqueness has to be checked across partitions. As an example, consider a situation where the primary key column is labeled ID and it is being partitioned by year on a column labeled CreationDate. Partition 206, illustrated in FIG. 2, can include all rows where CreationDate=2016 and partition 208 can include all rows where CreationDate=2015. The partitioning logic, in this example, can be evaluated first and determine that a row with ID=5 and CreationDate=2016-11-03 shall be inserted to a single partition, say partition 206 illustrated in FIG. 2. The insertion logic then has to check that there are no conflicts for ID=5 in partition 208 which contains values with creation dates for 2015. If partition 208 is not available, this check cannot be performed. In some examples, as a consequence of partition 208 not being available, the entire insert operation can fail.

An update to a table partition, such as table partition 206 or table partition 208, can include the addition of one or more rows, each row being given a new unique primary key value. An update to a table partition can also include the modification of the primary key value associated with one or more existing rows in the table partition. An update to a table partition can also include the removal of one or more existing rows, including the primary key value associated with one or more existing rows in the table partition. For example with expressions. Say x may be the representative numeric value for a primary key value. The primary key value x for one or more rows may be modified to x+1, for example with the SQL statement UPDATE tableName SET x=x+1 If all values x are unique, they are still unique after the statement. Given that the table is partitioned and that the update is processed in parallel on all partitions, it may happen that, at intermediate steps, duplicates arise when looking at the table as a whole. Consequently, it is important to perform uniqueness checks across the partitions. For the simple case where x=x+1 is being performed on the entire table, this step can be skipped as the check is not necessary due to the original keys being unique and the function requiring a change that results in unique keys. When such an expression, x=x+1 is executed only on a portion of the table, for example with a filter, such as the WHERE clause in SQL, a check across partitions must be performed.

After an update to a table partition of a table has occurred, the computing system associated with the database, of which the table is at least a part, needs to ensure that there are no conflicting primary key values across the table partitions of the table.

Figure 3:
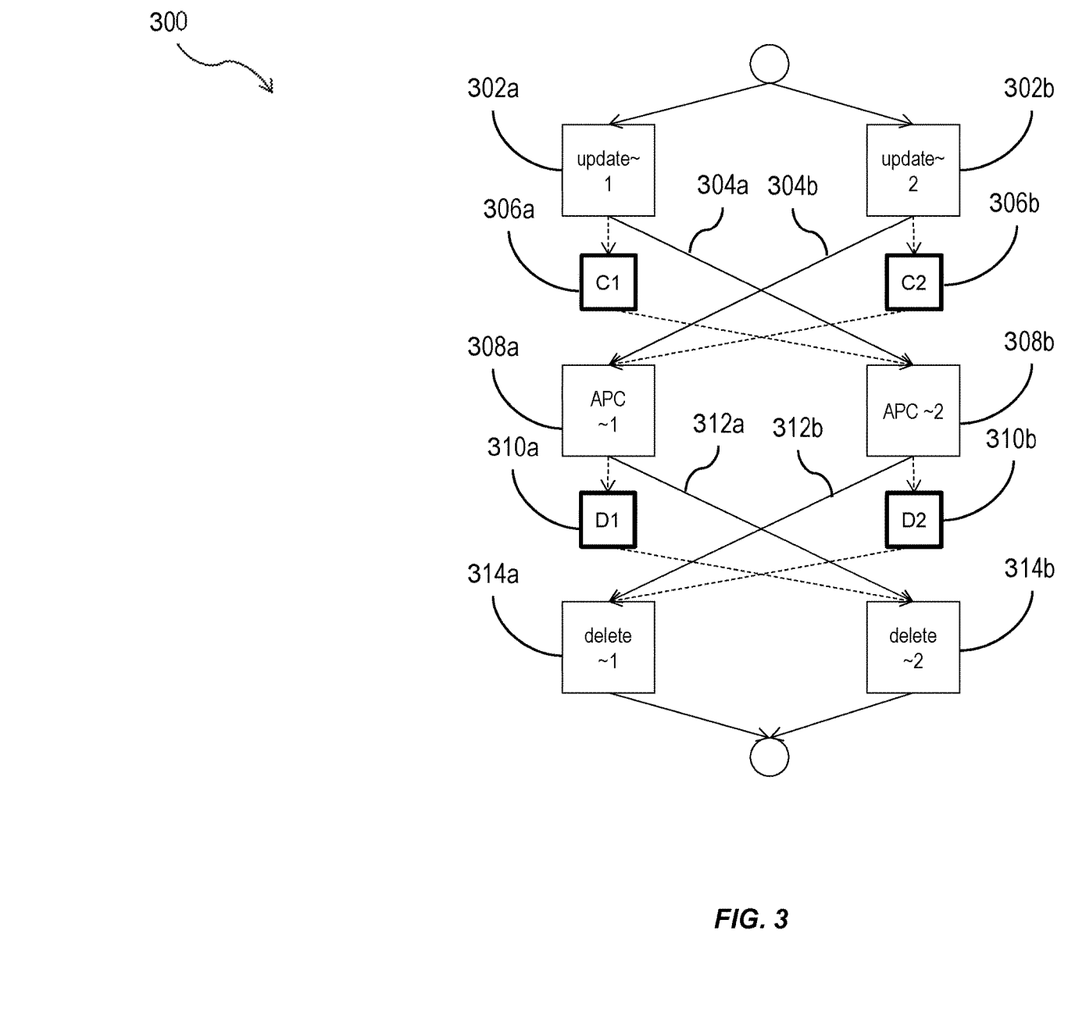
FIG. 3 is an illustration of a process flow for updating a database, having one or more features consistent with the present description.

FIG. 3 is an illustration of a process flow 300 for updating a database, having one or more features consistent with the present description. The process flow 300 for updating a database can be performed by one or more of the elements of the computing system 102, illustrated in FIG. 1, the first node 202 and/or the second node 204, illustrated in FIG. 2.

At 302a, an update call can be sent to a first partition 206 of a database table 114. The update call can include an instruction to remove from, modify and/or add to one or more rows of the first partition 206. The update can include a modification of one or more of the primary key values of rows within the first partition 206. The update can include an addition of one or more rows, having new primary key values, within the first partition 206. The update can include removal of one or more rows from the first partition 206. At 302a the instructed modifications to the first partition 206a can be conducted optimistically and transiently. Such a change is optimistic due to the primary key check having not yet been performed. As a result, it is not certain whether all changes conducted at 206a will persist. It is transient due to the change being only intermediate—the change is not yet visible to any other transaction in the database.

At 302b, an update call can be sent to a second partition 208 of the database table 114. Similar to the operations at 302a, the update call can include an instruction to remove, modify and/or add one or more rows to the second partition 208. The update to the second partition 208 can include a modification of the primary key values of one or more rows, removal of one or more rows, and/or an addition of one or more rows, having new primary key values, within the second partition 208. The modifications at 302b are being performed optimistically and transiently for the second partition 208.

At 304a, a control flow instruction can be generated that is associated with the first partition 206, the control flow instruction including an indication that the first partition has been updated. Similarly, at 304b, a control flow instruction can be generated that is associated with the second partition 208, the control flow instruction including an indication that the second partition has been updated.

At 302a, a data object 306a can be generated that includes an indication of the updated primary key values in the first partition. Similarly, at 302b, a data object 306b can be generated that includes an indication of the updated primary key values in the second partition.

At 308a, in response to generation of a data object 306b that includes an indication of the primary key values updated in the second partition, a check can be performed to determine whether any of the primary key values indicated in the modification at 302b conflict with primary key values of the first table partition 206. Similarly, at 308b, in response to generation of a data object 306a that includes an indication of the primary key values updated in the first partition, a check can be performed to determine whether any of the primary key values indicated in the modification at 302a conflict with primary key values of the second table partition 206. This process can be referred to as "Additional Part Check" (APC).

The Additional Part Check at 308a can generate the data object 310a, containing the conflicting primary key values or rows. Similarly, the Additional Part Check at 308b can generate the data object 310b, containing the conflicting primary key values or rows.

At 312a, a control flow instruction can be generated instructing the deletion of one or more rows from the second table partition 208 that have primary key values conflicting with one or more rows of the first table partition 206. Similarly, at 312b, a control flow instruction can be generated instructing the deletion of one or more rows from the first table partition 206 that have primary key values conflicting with one or more rows of the second table partition 208. The control flow instruction to delete one or more rows from a table partition can be generated and/or transmitted separately to the data flow that includes the data to be deleted.

At 314a, the rows in the first partition that have primary key values conflicting with rows in the second partition can be deleted and/or rolled-back. Similarly, at 314b, the rows in the second partition that have primary key values conflicting with rows in the first partition can be deleted and/or rolled-back. The operations at 314a and 314b can be performed in response to receipt of a control flow instruction 312b and 312a, respectively, obtaining the rows for deletion from the data objects 310a and 310b, respectively.

Figure 4:
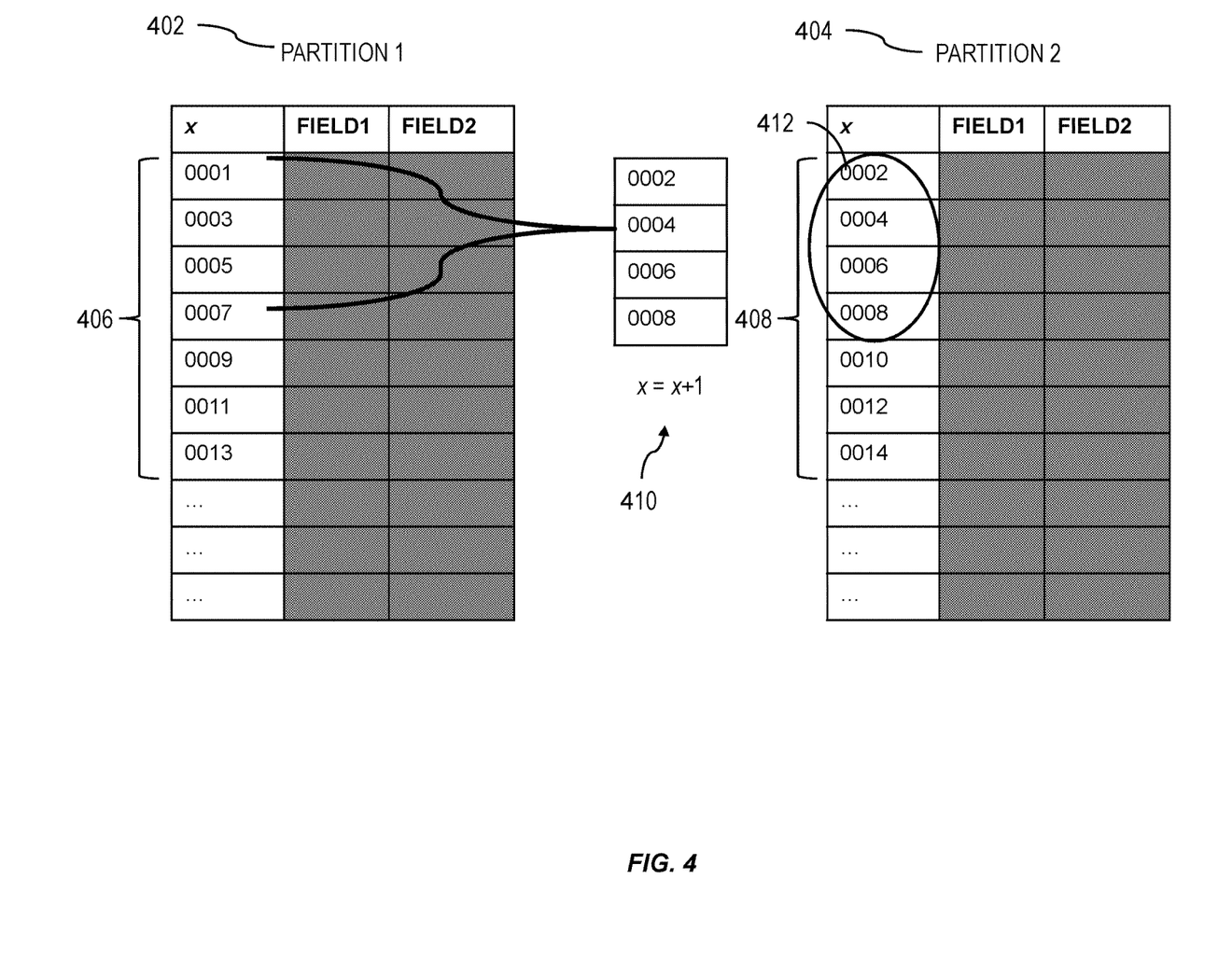
FIG. 4 illustrates a modification to the primary key values of rows from a first partition that would conflict with the primary key values in a second partition.

FIG. 4 illustrates a modification to the primary key values of rows from a first partition 402 that would conflict with the primary key values in a second partition 404. The first partition 402 includes a set of rows 406 that have a unique primary key value. The second partition 404 includes a set of rows 408 that also have a unique primary key value. The primary key values in both the first partition 402 and the second partition 404 are unique across both partitions and do not conflict. A modification 410 to the primary key values of a subset of the rows 406 in the first partition 402 can be received and cause primary key value values of the subset of the rows 406 in the first partition 402 to conflict with the primary key values of a subset of rows 412 of the second partition 404.

The update illustrated in FIG. 4 can be an update of the partitioning column where 1) the partitioning column(s) are identical to the primary key column(s), 2) the partitioning column(s) are a subset thereof the primary key column(s), or 3) no primary keys or secondary keys are defined. These conditions do not require an Additional Part Check to be executed. After the actual update of the data, it may be configured that a database trigger is executed. A database trigger is an operation configured, developed or implemented to occur after an update.

Figure 5:
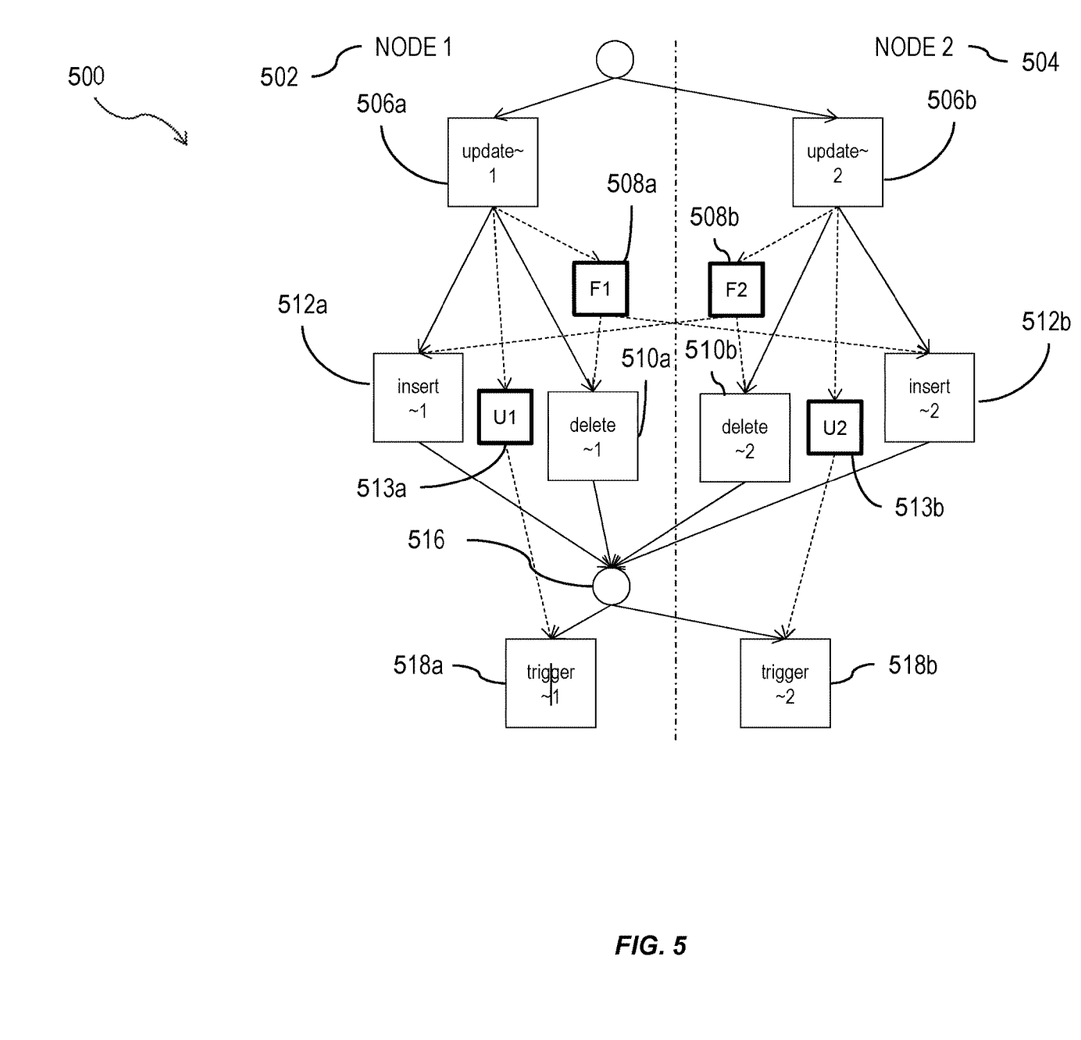
FIG. 5 is an illustration of a process flow for updating a database, having one or more features consistent with the present description.

FIG. 5 is an illustration of a process flow 500 for updating a database, having one or more features consistent with the present description. The process flow 500 shows a process flow for updating a first partition on a first node 502 and for updating a second partition on a second node 504. In some variations, the process flow 500 can be performed by one or more elements illustrated in FIG. 1 or FIG. 2. The process flow 500 can be configured to reduce the amount of data transmitted between the first node 502 and the second node 504. By reducing the amount of data transmitted between the first node 502 and the second node 504, the processing and/or memory resources can be reduced.

At 506a, an update call for the first partition on the first node 502 can be received at the first node 502. The update call can include an instruction to modify one or more values of the partitioning column(s) of the first partition on the first node 502. Similarly, at 506b, an update call for the second partition on the second node 504 can be received at the second node 504. The updates at 506a and 506b can be transient. This is because not all rows will comply with the partitioning criteria. As an example, the table can be partitioned using range partitioning, and partitioned by year. If the year changes due to an update from "2015" to "2016", say, the row no longer complies with the partitioning rules. Consequently, the row must be deleted from its old partition, for rows having a year of "2015," and inserted into the partition for rows having year values of "2016".

508a is a data object that includes the rows that no longer comply with the partitioning criteria of a partition, based on the instruction received at 506a. These rows can be referred to as "foreign" The data object 508a can be generated at 506a. The one or more foreign rows can be associated with the modified rows, primary key values or row IDs of the first partition in the first node 502. The foreign rows generated at 508a can be transmitted from the first node 502 to the second node 504 for insertion into the second partition.

508b is a data object that includes the rows that no longer comply with the partitioning criteria of a partition, based on the instruction received at 506b. These rows can be referred to as "foreign" rows. The data object 508b can be generated by 506b. The one or more foreign rows can be associated with the modified rows, primary key values or row IDs of the second partition in the second node 504. The foreign rows generated at 508b can be transmitted from the second node 504 to the first node 502 for insertion into the first partition.

At 510a, based on a control flow instruction associated with the update received at 506a, one or more rows can be deleted from the first partition on the first node 502. Similarly, at 510b, based on a control flow instruction associated with the update received at 506b, one or more rows can be deleted from the second partition on the second node 504. for the rows deleted at 510a and 510b are the "foreign" rows that no longer comply with the partitioning rules from their respective partitions and must, therefore, be removed from their respective partitions.

At 512a, based on a control flow instruction associated with the update received at 506a, one or more rows can be received from the second node 504 and inserted into the local first partition. The foreign rows to be inserted have been generated at 506b and are provided via data object 508b. Likewise for 512b.

516 is a synchronization point for the control flow. Once all plan operations have been executed up to this point, the requested update has been processed, all data is consistent. As a trigger has been configured to be executed after the update, and that trigger is allowed to access the table that has just been updated, a so-called "trigger with subject table access", it is required that the table is consistent. This makes the synchronization point necessary.

At 518a, a trigger can execute, on the first partition of the first node 502, after the synchronization point 516 was reached. In some variations, a trigger can be a stored procedure that automatically executes when an event occurs in a database. Similarly, at 518b, a trigger can execute on the second partition in the second node 504, in response to the reached synchronization point 516 which happens to be located, evaluated and/or controlled on node 502. The trigger body/implementation can be provided with the updated data. That data is produced by 506a and 506b respectively and producing the data objects 513a and 513b. Note that the data objects do not leave the boundaries of the respective nodes where they are produced and consumed, whereas the control flow does. This reduces the network overhead. In one example, when a modification to a partition table is attempted through a data manipulation language (DML) event, a DML trigger can be executed.

The way the control flow is illustrated in FIG. 5 is merely exemplary. A similar, or the same, order of execution may also be achieved with a different wiring of the plan operations.

In some implementations, a benefit of the presently described subject matter may include reducing the number of data transfers between nodes when updating a partition in a data store. This can be achieved by updating the partitions in the data stores prior to synchronizing the partitions.

Figure 6:
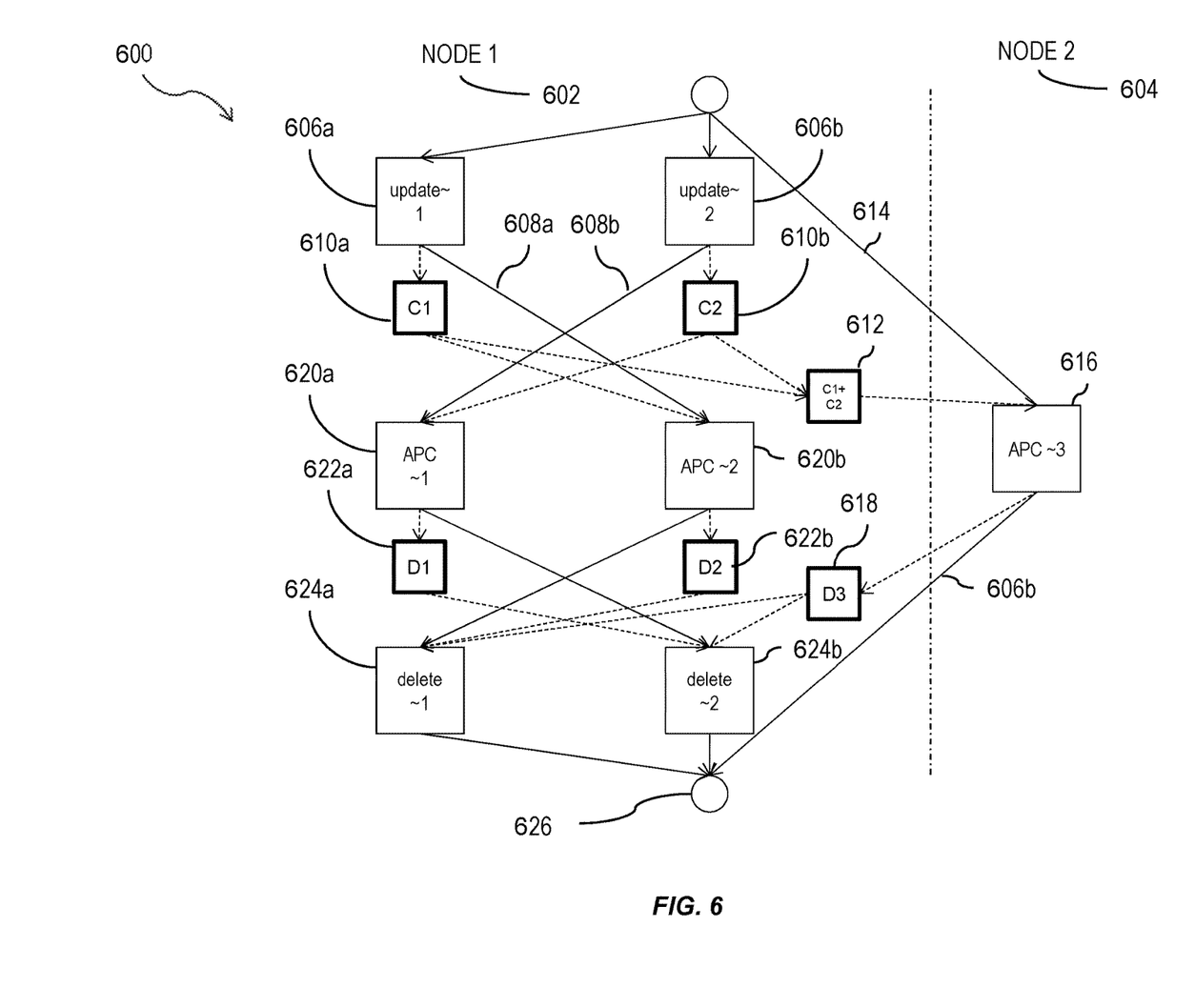
FIG. 6 is an illustration of a process flow for updating a database, having one or more features consistent with the present description.

FIG. 6 is an illustration of a process flow 600 for updating a database, having one or more features consistent with the present description. The process flow 600 for updating a database can be performed by one or more of the elements of the computing system 102, illustrated in FIG. 1, the first node 202 and/or the second node 204, illustrated in FIG. 2.

The process flow 600 is similar to the process flow 300 illustrated in FIG. 3, however, the process flow 600 is a process flow performed on a first node 602 having a first partition and a second partition, and a second node 604 having a third partition. In other words, compared to the process flow 300, the process flow 600 requires synchronization of primary keys with a second data store. The first node 602 and the second node 604 can be connected via a network.

In some implementations, a benefit of process 600 may include limiting the number of network interactions and the amount of data transmitted during these network interactions. Limiting network interactions can increase the efficiency at which a database table can be updated. In some databases, different nodes that hold partitions of the same table can be long distances apart. Long-distance transmission of data can result in reduced bandwidth causing slow transmission of data, increased packet loss requiring repeat transmission of data, or the like. By reducing the number of network interactions when updating a database table, the speed at which the database table is updated can be increased.

At 606a, an update call can be received at the first node 602, the update call for the first partition stored on a first node 602. Similarly, at 606b, an update call can be received at the second node 604, the update call for the second partition on the first node 604. The update call(s) can include an instruction to delete, modify and/or add one or more rows of the first partition and/or the second partition on the first node 602.

At 608a, a control flow instruction can be generated that is associated with the first partition. Similarly, at 608b, a control flow instruction can be generated that is associated with the second partition. The control flow instruction generated that is associated with the first partition can include an indication of the updated primary keys in the first partition and the control flow instruction generated that is associated with the second partition, can include an indication of the updated primary keys in the second partition.

610a is a data object that contains rows having the changed primary key values during the update at 606a to the first partition. Similarly, 610b is a data object that contains the changed primary key values during the update at 606b to the second partition. The generation of the data object can be separate from the control flow instructions.

At 612, the update to the first partition and the second partition on the first node 602 can be combined and transmitted from the first node 602 to the second node 604. A control flow instruction 614 can be transmitted from the first node 602 to the second node 604 when an update is received at the first node 602.

At 616, based on the receipt of the combined updates to the first and second partitions on the first node 602, the third node 604 can be configured to perform an Additional Part Check. The Additional Part Check can be configured to determine whether any primary key of the first partition or the second partition conflict with a primary key of a third partition. By transmitting the update to both the first partition and the second partition from the first node 602 to the second node 604, in a combined manner, the number of network interactions is reduced compared to having each partition in the first node 602 individually cross-checked against each partition in the second node 604.

At 618, in response to the Additional Part Check at 616, the second node 604 can transmit an indication of the conflicting rows to the first node 602. The conflicting rows in both the first partition and the second partition can be transmitted in a combined manner.

At 620a, an Additional Part Check can be performed in response to receipt of the control flow instruction 608b to determine whether any of the primary key values of the updated second partition conflict with primary key values of the first table partition. Similarly, at 620b, an Additional Part Check can be performed in response to receipt of the control flow instruction 608a to determine whether any of the primary key values of the updated first partition conflict with primary key values of the second table partition.

622a is a data object containing those primary key values in the updated second partition that conflict with the primary key values in the first partition. Similarly, 622b is a data object containing those rows having primary key values in the updated first partition that conflict with the primary keys in the second partition.

At 624a, the rows associated with the identified conflicting primary key values in the updated first partition are deleted and/or rolled back to a prior version. Similarly, at 624b, the rows associated with the identified conflicting primary key values in the updated second partition are deleted and/or rolled back to a prior version.

At 626, an indication that the conflicting primary key values have been deleted from the partitions on the first node 602 and an indication that the second node 606 has provided an indication of which primary key values conflict with the partition(s) on the second node 604 can end the process, or cause a trigger, or the like.

In some variations, a row can be rolled-back to a prior version by querying a cache. A computing system, such as computing system 102, that is configured to facilitate database management may include a cache which includes recent versions of partition tables, or the like. When a row of a partition table needs to be rolled-back, the computing system can query the cache and obtain the prior version. In some variations, the computing system for managing a database can include a data logger configured to generate a log for every change occurring in the database. When a row associated with a conflicting primary key value needs to be rolled back to a prior version, the computing system can consult the log associated with that row and walk the row back, based on the instructions provided by the log.

Rolling-back a row having a conflicting key can include rolling-back the entire partition table and not just the row. In some variations, only entire partition tables may be cached or logged.

In this document, part, partition and table partition are used interchangeably. Similarly, node and network node are used interchangeably.

Figure 7:
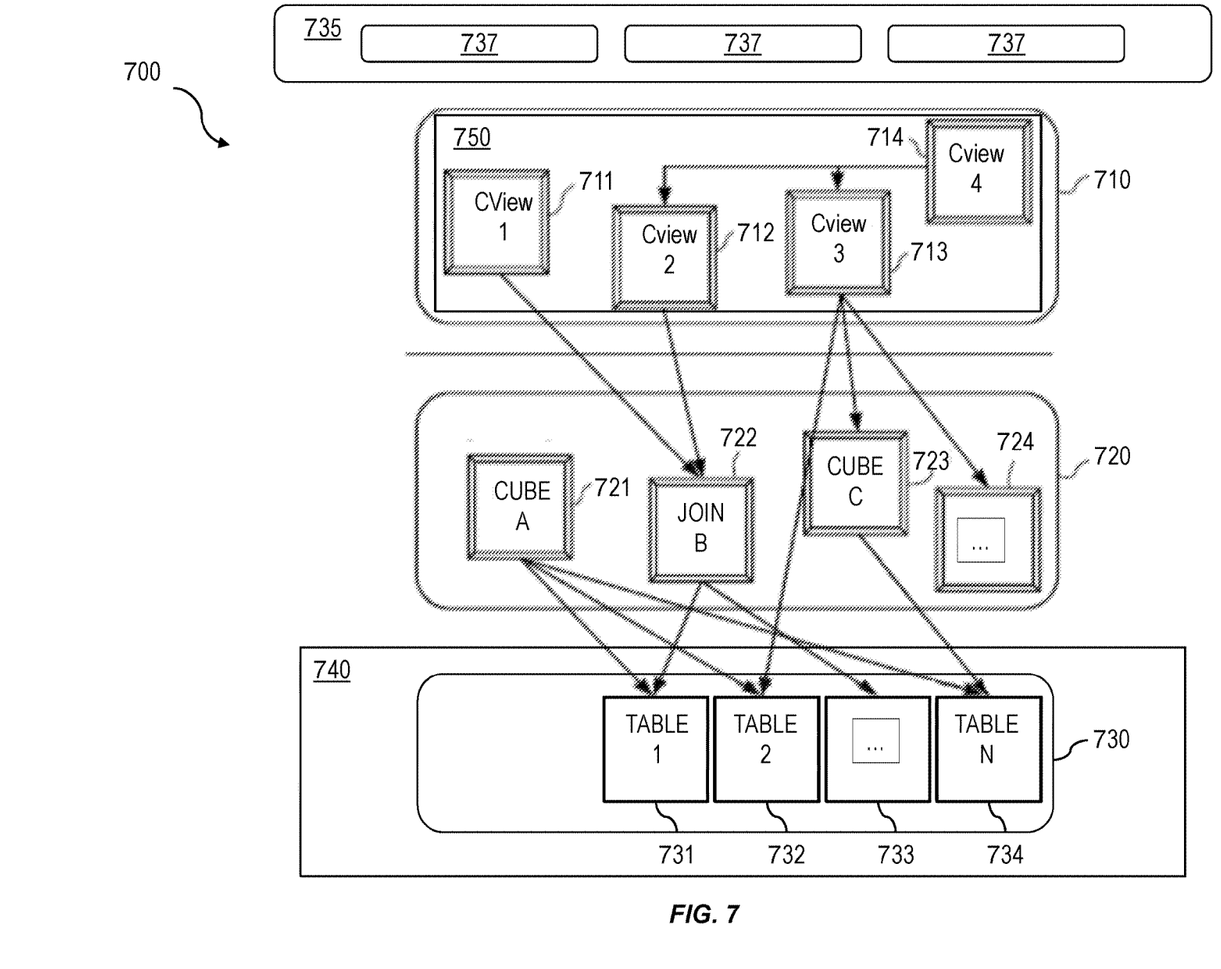
FIG. 7 is a diagram that illustrates a computing architecture, having one or more features consistent with the present description.
Figure 8:
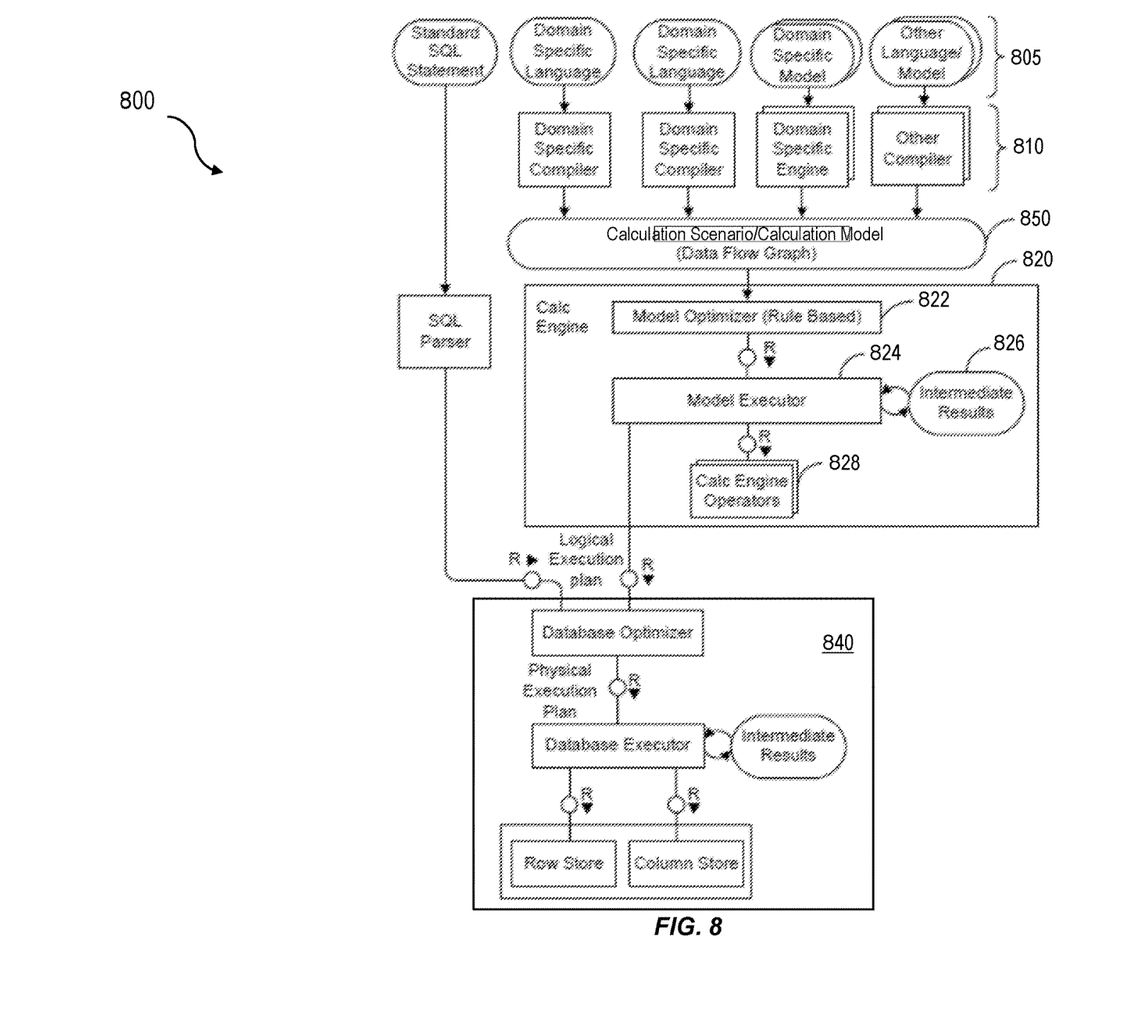
FIG. 8 is a diagram illustrating a sample architecture for request processing and execution control, having one or more features consistent with the present description.

FIG. 7 is a diagram that illustrates a computing architecture 700 having one or more features consistent with the present description. The computing architecture 700 can facilitate updating of a multiple partition database table, such as database table 116 illustrated in FIG. 1 having, at least, a first partition 206 and a second partition 208. The computing architecture 700 can include a database system that includes three layers: a top layer, or calculation engine layer 710, an intermediate layer, or logical layer 720, and a top layer, or physical table-pool 730. One or more application servers 735 implementing database client applications 737 can access the database system 800, as shown in FIG. 8. Calculation scenarios can be executed by a calculation engine, which can form part of a database or which can be part of the calculation engine layer 710 (which is associated with the database). The calculation engine layer 710 can be based on and/or interact with the other two layers, the logical layer 720 and the physical table pool 730. In some variations, the physical table pool 730 can comprise database operations configured to access and perform the database operations on the individual tables. In some variations, the basis of the physical table pool 730 consists of physical tables (called indexes) containing the data, which can be stored on one more database servers 740. Various tables 731-734 can be joined using logical metamodels 721-724 defined by the logical layer 720 to form an index. For example, the tables 731-734 in a cube (e.g. an online analytical processing or "OLAP" index) can be assigned roles (e.g., fact or dimension tables) and joined to form a star schema. It is also possible to form join indexes (e.g. join index B 722 in FIG. 7), which can act like database views in computing environments such as the Fast Search Infrastructure (FSI) available from SAP SE of Walldorf, Germany.

A calculation scenario 750 can include individual nodes (e.g. calculation nodes) 711-2714, which in turn can each define operations such as joining various physical or logical indexes and other calculation nodes (e.g., CView 4 is a join of CView 2 and CView 3). That is, the input for a node 711-714 can be one or more physical, join, or OLAP indexes or calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

In a calculation scenario 750, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 250 can be created which can be reused by multiple queries even if such queries do not require every attribute specified by the calculation scenario 750. For on-the-fly scenarios, this can mean that the same calculation scenario (e.g., in XML format, etc.) can be used for different queries and sent with the actual query. The benefit may be that on application server side the XML description of a calculation scenario can be used for several queries and thus not for each possible query one XML has to be stored.

Every calculation scenario 750 can be uniquely identifiable by a name (e.g., the calculation scenario 750 can be a database object with a unique identifier, etc.). Accordingly, the calculation scenario 750 can be queried in a manner similar to a view in a SQL database. Thus, the query is forwarded to the calculation node 711-714 for the calculation scenario 750 that is marked as the corresponding default node. In addition, a query can be executed on a particular calculation node 711-714 (as specified in the query). Furthermore, nested calculation scenarios can be generated in which one calculation scenario 750 is used as source in another calculation scenario (e.g. via a calculation node 711-714 in this calculation scenario 750). Each calculation node 711-714 can have one or more output tables. One output table can be consumed by several calculation nodes 711-714.

FIG. 8 is a diagram 800 illustrating a sample architecture for request processing and execution control. As shown in FIG. 8, artifacts 805 in different domain specific languages can be translated by their specific compilers 810 into a common representation called a "calculation scenario" 750 (which is also referred to in FIG. 8 as a calculation model). To achieve enhanced performance, the models and programs written in these languages are executed inside the database server 840. This arrangement eliminates the need to transfer large amounts of data between the database server 840 and a client application 837, which can be executed by an application server 835. Once the different artifacts 805 are compiled into this calculation scenario 815, they can be processed and executed in the same manner. A calculation engine 820 executes the calculation scenarios 815.

To process queries submitted through the calculation engine layer 710 using a calculation scenarios 750, the physical layer 730 may be required to load one or more tables 731-734 into the main memory 118 of the computing system 102. There may be occasion where there is insufficient capacity to load one of the tables, in its entirety, into the memory. Not having the whole table in the main memory 118 can create a situation here the computing system 102 has to continually communicate with disk memory on which a copy of the table may be stored. This increases the processing time of the executed calculation scenario 750.

Similarly, the calculation nodes 711-714 may include one or more constraints that narrow the part of the table that needs to be processed. The constraints may result in a subset of the rows of a table that require processing. Consequently, there would be no need to load every row of the table into the main memory 118 of the computing system 102.

Figure 9:
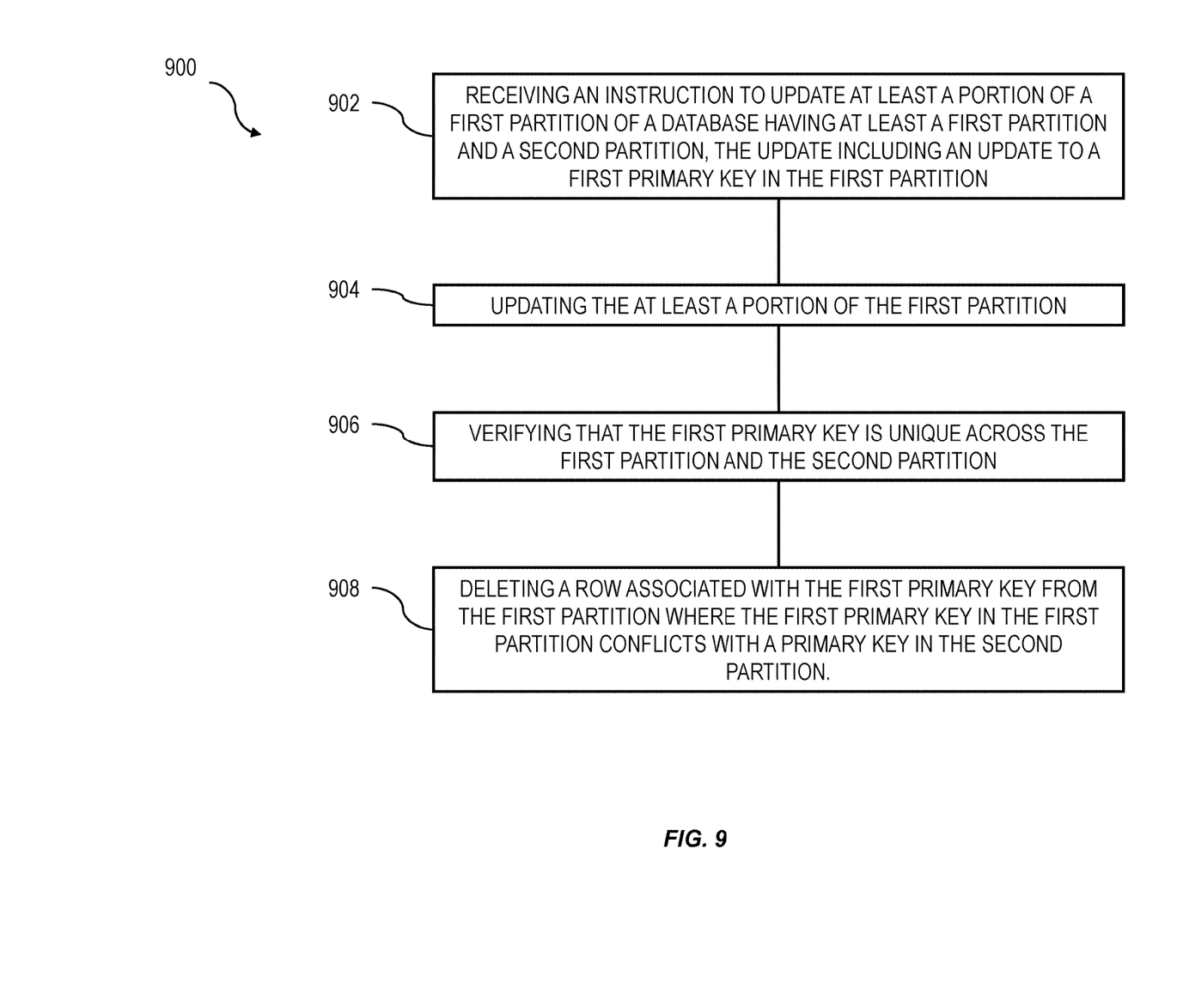
FIG. 9 is a process flow diagram illustrating a method having one or more features consistent with the present description.

FIG. 9 is a process flow diagram illustrating a method 900 having one or more features consistent with the present description. One or more of the features of method 900 can be performed by one or more of the components illustrated in FIGS. 1 and 2. The operations described with respect to method 900 are not intended to be limiting. One or more operations can be combined or separated. The order of the operations described herein is not intended to be limiting. The one or more operations can be performed in any order.

At 902, an instruction can be received. The instruction can be to update at least a portion of a first partition of a database having at least a first partition and a second partition. In some variations, the update can include an update to a first primary key value in the first partition. An update to the first primary key value can include a modification of the first primary key value, an addition of a new primary key value, or a removal of an existing primary key value. Addition of a new primary key value can include the addition of a whole new row to the partition. Removal of an existing primary key value can include the removal of a whole row to the partition.

At 904, at least a portion of the first partition can be updated. The at least apportion of the first partition can be updated in accordance with the instruction. For example, the instruction may be to modify one or more of the primary keys of the first partition. An example of a modification of a primary key can be represented in the following manner. If the primary key is given by x a modification to the primary key may be represented as x+1, where the one or more primary key values are amended by a one integer increase.

At 906, verification that the first primary key value is unique across the first partition and the second partition can be performed. Verification that the first primary key value is unique across all partitions of a table can be performed. In some variations, the first partition and the second partition may be located on different nodes, where the nodes are connected via a network. Verification that the first primary key value is unique across all partitions of a table can be performed by transmitting a control flow instruction associated with the first partition to the second partition and also transmitting an indication of the updated primary keys, separately from the control flow instruction. The verification can be performed by the node associated with the second partition, with the results of the verification sent back to the first node. In some variations, verifying that the first primary key value is unique across the first partition and the second partition can be performed subsequent to the updating of the second partition. The verifying can be facilitated by a control flow between the first partition and the second partition, the control flow being separate from a data flow between the first partition and the second partition.

At 908, a row associated with the first primary key value can be deleted from the first partition. The row associated with the first primary key value can be deleted when the first primary key value in the first partition conflicts with a primary key in the second partition. In some variations, deleting the row can include removing the record from the partition table. In other variations, deleting the row can include rolling the row back, and therefore the primary key value associated with it, to a former version that does not conflict with the second partition.

In some variations, an update to at least a portion of the second partition can be received and processed in parallel to the update to the at least a portion of the first partition. Rows that have primary keys in the second partition conflicting with primary keys in the first partition can be deleted and/or rolled-back in a similar manner. Verifying that the second primary key is unique across the first partition and the second partition can be performed subsequent to the updating of the second partition.

Without in any way limiting the scope, interpretation, or application of the claims appearing herein, a technical effect of one or more of the example embodiments disclosed herein may include providing an operation that may read data from a data table in data chunks. This may speed up the data processing when (i) only a partial amount of data from the table is required, (ii) where the amount of available main memory is insufficient to load the entire table, such as in big data applications, (iii) to process multiple chunks in parallel, and the like. The presently described subject matter may increase the efficiency of the database management system, reducing processing times, energy costs, database management system cooling costs, and the like.

Without in any way limiting the scope, interpretation, or application of the claims appearing herein, a technical effect of one or more of the example embodiments disclosed herein may include reducing the number of network interactions required to facilitate updating of a database table partitioned into multiple partitions and/or nodes.

Without in any way limiting the scope, interpretation, or application of the claims appearing herein, a technical effect of one or more of the example embodiments disclosed herein may include facilitating table partition updates with reduced processing and/or memory requirements.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A system, comprising:
    a first store node storing a first partition of a table of a database;
    a second store node storing a second partition of the table of the database, the second store node being communicatively coupled to the first store node; and
    a database management system including
        at least one programmable processor; and
        a non-transitory machine-readable medium storing instructions that, when executed by the at least one programmable processor, cause the at least one programmable processor to perform operations including
            updating at least a first portion of the first partition, the updating including an update to a first primary key column in the first partition,
            verifying that the first primary key column is unique across the first partition and the second partition, and
            deleting a first row having a first primary key value of the first primary key column from the first partition, when the first primary key value in the first partition is determined to conflict with a second primary key value of a second primary key column in the second partition based on a comparison of the first primary key value to the second primary key value, the comparison resulting in generation of a data object containing conflicting key values, the data object being separate from the first and second partitions and being used to select rows in at least one of the first partition and the second partition for deleting.

2. The system of claim 1, wherein the operations further comprise
    updating at least a second portion of the second partition, the update, of the at least the second portion of the second partition including an update to a second primary key value of the second primary key column in the second partition.

3. The system of claim 2, wherein the operations further comprise
    verifying that the second primary key value is unique across the first partition and the second partition.

4. The system of claim 3, wherein the operations further comprise
    deleting a second row having the second primary key value from the second partition when the second primary key value conflicts with a first primary key value in the first partition.

5. The system of claim 1, wherein the operations further comprise verifying that the first primary key value is unique across the first partition and the second partition subsequent to the update of the first partition.

6. The system of claim 4, wherein the operations further comprise verifying that the second primary key value is unique across the first partition and the second partition subsequent to the update of the second partition.

7. The system of claim 1, wherein the operations further comprise verifying at the first primary key value is unique across the first partition and the second partition using a control flow between the first partition and the second partition, the control flow being separate from a data flow between the first partition and the second partition.

8. The system of claim 1, wherein the operations further comprise updating at least the first portion of the first partition by adding an additional row having a new primary key value to the first partition.

9. The system method of claim 1, wherein the operations further comprise updating at least the first portion of the first partition by modifying an existing primary key value in the first partition.

10. The system of claim 8, wherein the operations further comprise modifying the existing primary key column in the first partition by numerically shifting a value of the primary key values of the existing primary key column.

11. The system of claim 1, wherein the update of the at least a first portion of the first partition is facilitated by the data object that includes an indication of the updated primary key values in the first partition.

12. The system of claim 1, wherein the operations further comprise
    generating a data object that includes an indication of the first row to delete from the first partition.

13. A computer-implemented method, comprising:
    updating at least a first portion of a first partition of a table of a database in a first store node, the updating of the at least the first portion of the first partition including an update to a first primary key column in the first partition;
    verifying that the first primary key column is unique across the first partition and a second partition of the table of the database in a second store node, the second store node being communicatively coupled to the first store node; and
    deleting a first row having a first primary key value of the first primary key column from the first partition, when the first primary key value in the first partition is determined to conflict with a second primary key value of a second primary key column in the second partition based on a comparison of the first primary key value to the second primary key value, the comparison resulting in generation of a data object containing conflicting key values, the data object being separate from the first and second partitions and being used to select rows in at least one of the first partition and the second partition for deleting.

14. The method of claim 13, further comprising:
    updating at least a second portion of the second partition, the updating of the at least the second portion of the second partition including an update to a second primary key value of the second primary key column in the second partition.

15. The method of claim 14, further comprising:
verifying that the second primary key value is unique across the first partition and the second partition.

16. The method of claim 15, further comprising:
deleting a second row having the second primary key value from the second partition when the second primary key value conflicts with a first primary key value in the first partition.

17. The method of claim 13, further comprising verifying that the first primary key value is unique across the first partition and the second partition subsequent to the update of the first partition.

18. The method of claim 16, further comprising verifying that the second primary key value is unique across the first partition and the second partition subsequent to the update of the second partition.

19. The method of claim 13, further comprising verifying that the first primary key value is unique across the first partition and the second partition using a control flow between the first partition and the second partition, the control flow being separate from a data flow between the first partition and the second partition.

20. The method of claim 13, further comprising updating at least the first portion of the first partition by adding an additional row having a new primary key value to the first partition.

21. The method of claim 13, further comprising updating at least the first portion of the first partition by modifying an existing primary key value in the first partition.

22. The method of claim 21, further comprising modifying the existing primary key column in the first partition by numerically shifting a value of the primary key values of the existing primary key column.

23. The method of claim 13, wherein the updating of the at least the first portion of the first partition is facilitated by the data object that includes an indication of the updated primary key values in the first partition.

24. The method of claim 13, further comprising:
generating a data object that includes an indication of the first row to delete from the first partition.

* * * * *